INVENTORS
LANNY L. HARKLAU
RAYMOND H. JAMES
BY Thomas J. Nikolai
ATTORNEY

INVENTORS
LANNY L. HARKLAU
RAYMOND H. JAMES
BY Thomas J. Nikolai
ATTORNEY

INVENTORS
LANNY L. HARKLAU
RAYMOND H. JAMES
BY Thomas J. Nikolai
ATTORNEY 3,432,821

DETECTOR FOR A SEARCH MEMORY

Lanny L. Harklau, Minneapolis, and Raymond H. James, Bloomington, Minn., assignors to Sperry Rand Corporation, New York, N.Y., a corporation of Delaware Filed May 13, 1964, Ser. No. 367,121
U.S. Cl. 340—174 12 Claims
Int. Cl. G11b 5/00

ABSTRACT OF THE DISCLOSURE

An apparatus and a method of operation of magnetizable memory elements whereby there is achieved an asymmetrical switching threshold for bipolar drive fields.

This invention in its preferred embodiment utilizes memory elements of magnetizable material and in particular such elements that are capable of storing discrete levels of data as a function of the degree of the partial switching of the elements' magnetic flux from an initial substantially demagnetized state. The terms "signal," "pulse," etc., when used herein shall be used interchangeably to refer to the current signal that produces the corresponding magnetic field and to the magnetic field produced by the corresponding current signal. Accordingly, a discussion of such elements and their modes of operation is given below.

Ordinary magnetizable cores and circuits utilized in destructive readout devices are now so well known that they need no special description herein, however, for purposes of the present invention, it should be understood that such magnetizable cores are capable of being magnetized to saturation in either of two directions. Furthermore, these cores are formed of magnetizable material selected to have a rectangular hysteresis characteristic which ensures that after the core has been saturated in either direction a definite point of magnetic remanence representing the residual flux density in the core will be retained. The residual flux density representing the point of magnetic remanence in a core possessing such characteristic is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the threshold characteristic of a core having a substantially rectangular hysteresis characteristic. In this technique, a minimum of two interrogate lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One method of achieving a decreased magnetic core switching time is to employ the partial switching technique of time-limited switching as compared to the complete switching technique. In employing an amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a stabilized condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer-switching times than other cores, and it is necessary for the proper operation of a memory system that all the cores therein reach the same state or degree of magnetization on read out of the stored data. Also, where the final core flux density level is limited solely by the amplitude of the applied drive field, it is necessary that the cores making up the memory system be carefully graded such that the output signal from each core is substantially the same when the state of each core is reversed or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable state, the flux density of which is considerably less than the flux density of the second stable-state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, Supplement, vol. 32, No. 3, pp. 38S-39S, March 1961, provides excellent background material for the time-limited switching technique.

The magnetic conditions and their definitions as discussed above may now be itemized as follows:

PARTIAL SWITCHING

*Amplitude-limited.*—Condition wherein with a constant drive field amplitude, increase of the drive field duration will cause no appreciable increase in core flux density.

*Time-limited.*—Condition wherein with a constant drive field amplitude, increase of the drive field duration will cause appreciable increase in core flux density.

COMPLETE SWITCHING

*Saturated.*—Condition wherein increase of the drive field amplitude or duration will cause no appreciable increase in core flux density.

*Stable-state.*—Condition of the magnetic state of the core when the core is not subject to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The preferred embodiment of the present invention is concerned with an apparatus and a method of operation of a magnetizable memory element having a substantially rectangular hysteresis characteristic in which the element, or core, is initially set into a substantially demagnetized state. Subsequent coupling of an amplitude-limited pulse thereto moves the core's magnetization into a "set" amplitude-limited remanent magnetic state. Any subsequent coupling thereto of an amplitude-limited pulse of an equal or less amplitude-duration characteristic, either of the same or opposite polarity is ineffective as regards the previously established "set" remanent magnetic state. Furthermore, the drive field intensity required to establish this "set" remanent magnetic state is substantially less than that normally utilized in prior art techniques. Additionally, as the total flux switched is determined only by the drive field characteristic, the total flux switched in any one core of an array of a plurality of cores is independent of any variation in individual core magnetic characteristics. Accordingly, there is provided a method whereby a conventional magnetizable memory element may be utilized as a detector of minimum intensity bipolar drive fields.

Accordingly, it is a primary object of the present invention to provide a novel method of operating a magnetizable memory element.

It is a further object of the present invention to provide an apparatus and a method of operation of a magnetizable memory element whereby the element is initially conditioned into a demagnetized state and which can then be placed into a set magnetic state of substantial positive or negative magnetic remanence.

It is a further object of the present invention to provide an apparatus and a method of operation of a magnetizable memory element whereby the element is initially conditioned into a demagnetized state and which can then be placed into a set magnetic state of substantial positive or negative magnetic remanence.

It is a further object of the present invention to provide an apparatus and a method of operation of a magnetizable memory element whereby there is established different switching thresholds for negative and positive drive fields.

In one application of the present invention magnetizable memory elements, or cores, are utilized as detectors of a magnetic memory array. In this application two cores are serially, oppositely-magnetically coupled to the sense line of each multi-bit word of a true-complement Search memory. The serial bit search of the multi-bit word induces in said sense line pulses indicative of a mismatch; a positive pulse for a true mismatch, and a negative pulse for a complement mismatch. The first mismatch signal sets the magnetic states of both cores into opposite set magnetic states of substantial magnetic remanence from their initial demagnetized state. Subsequent mismatch signals, of a positive or negative polarity, are "locked out," i.e., are ineffective to alter these set states. After the search cycle has been completed interrogation of the two cores provides an output signal indicative of the result of the previous search cycle.

Accordingly, it is a primary object of the present invention to provide a detector for a Search memory.

It is a further object of the present invention to provide a detector for a Search memory that is capable of detecting and storing one of three possible search cycle conclusions; greater than, less than or equal to.

These and other more detailed and specific objects will be disclosed in the course of the following specification, reference being had to the accompanying drawings, in which.

To better understand a novel aspect of the present invention, a discussion of a constant current source driving signal as opposed to the use of a constant voltage source driving signal is presented.

Figure 1:
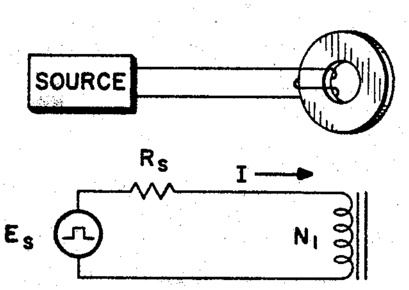
FIG. 1 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 1 illustrates the general circuit of a source driving a toroidal ferrite core with its equivalent circuit:

$E_s$=source voltage
$R_s$=source internal resistance
$N_1$=number of turns in the coil about the core
I=current flowing through the coil about the core This circuit may be defined mathematically by Equation 1

$$E_s=IR_s-N\frac{d\phi}{dt} \tag{1}$$

with it being assumed that the core is always initially in its negative saturated state and that the drive signal from the source drives the magnetic state of the core toward its positive saturated state. By making $R_s$ sufficiently small, Equation 1 reduces to Equation 2.

$$E\cong -N\frac{d\phi}{dt} \tag{2}$$

Therefore by making $R_s$ sufficiently small the conditions of a constant voltage source are fulfilled. Since $E_s$ and N are constants, $d\phi/dt$ is also a constant, and consequently the flux reversal is a linear function of time.

$$\int_{-\phi_s}^{-\phi_1} d\phi=\frac{E_s}{N_1}\int_0^t dt$$

$$\phi_s-\phi_1=\frac{E_s t}{N_1} \tag{3}$$

For a complete flux reversal the integral, taken from $-\phi_s$ to $+\phi_s$, is (with $T_s$=time required for a complete flux reversal from $-\phi_s$ to $+\phi_s$)

$$\int_{-\phi_s}^{+\phi_s} d\phi = \frac{E_s}{N_1}\int_0^{T_s} dt$$

$$2\phi_s = \frac{E_s T_s}{N_1} \tag{4}$$

The voltage E induced in any coil about the core is (with $N_2$=the number of turns of a second coil on the core)

$$E = \frac{E_s N_2}{N_1} = \frac{2\phi_s}{T_s} N_2$$

Figure 3:
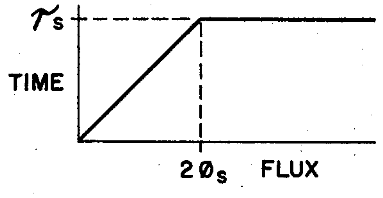
FIG. 3 is an illustration of the plot of flux versus time of the core of FIG. 1.
Figure 2:
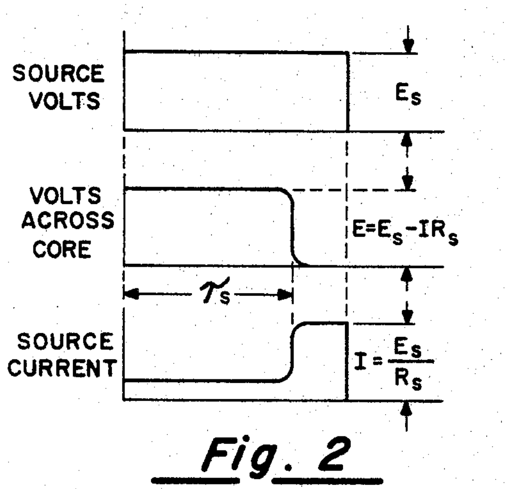
FIG. 2 is an illustration of the resulting voltages and currents of the circuit of FIG. 1 when driven by a constant voltage source.

The resulting voltages and currents under constant voltage source conditions are illustrated in FIG. 2, Equations 3 and 4 show that a plot of flux $\phi$ versus time would be as illustrated in FIG. 3. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_s$ as illustrated in FIG. 3 is due to the characteristics of the constant voltage source rather than those of the core.

If $R_s$ is made sufficiently large, Equation 1 reduces to Equation 5.

$$E_s \cong IR_s \tag{5}$$

Figure 4:
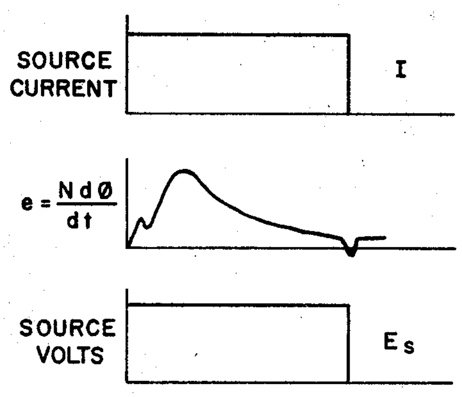
FIG. 4 is an illustration of the resulting voltages and currents of the circuit of FIG. 1 when driven by a constant current source.

Therefore, by making $R_s$ sufficiently large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 4. It is under these constant current source conditions that this present invention is concerned.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux saturated state is given as follows:

$$\tau_s = \frac{S_w}{H-H_o} = \frac{S_w'}{NI-NI_o}$$

where:

r=radius of toroidal core
$\tau_s$=switching time
I=current in amperes
$S_w$=material constant
N=number of turns
H=applied field in oe. (oersteds) $=NI/5r$
$H_o$=switching threshold in oe. $=NI_o/5r$
$Sw'=Sw5r$ With particular reference to FIG. 5 there is illustrated a residual magnetization curve 10 of the magnetic devices utilized by the present invention. Curve 10 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 12 and 14 are the normal magnetization curves from the demagnetized state $\phi_0$ which curves are achieved by the application of positive and negative drive fields, respectively. These curves are obtained by applying drive field current pulses of different amplitudes and of a duration greater than the longest $\tau_s$ of the core so as to permit the total possible flux change representative of th particular drive field amplitude to occur. Curves 16–2 are the residual magnetization curves from the initia demagnetized state $\phi_0$. By applying set drive field cur rent pulses of different amplitudes and of a duratio greater than the longest $\tau_s$ the magnetic state of the cor is moved along the normal magnetization curve 12 or 14 depending upon the polarity of the set drive field, comin to rest at points 28, 30 or 32 or points 34, 36 or 38 alon curves 12 or 14, respectively, depending upon the ampli tude of the applied set drive field. Upon cessation of th set drive field, the magnetic state of the core falls bacl toward the line 40, of zero applied field, coming to res at a set stable-state thereon. Subsequent application o a positive or negative drive field of the same amplitude duration characteristic as the set drive field that move the magnetic state of the core from the demagnetize state to the set stable-state of substantial magnetic change causes the magnetic state of the core to merely mov along a line of substantially constant flux density return ing to its original set stable-state along line 40. Applicants have discovered that in the operation as described abov there is realized an asymmetrical switching threshold a regards a subsequent drive field of a polarity opposite t the set drive field. This asymmetry ensures that a subse quent drive field of the same or opposite polarity but o the same amplitude-duration characteristic as the se drive field that moved the core's magnetic state into th set stable-state, will not drive the core's magnetic stat into an area of substantially different flux density, i.e. beyond the switching threshold, so as to permit the core' magnetization after cessation of the subsequent driv field to fall back upon line 40 at a new stable-state of a different flux density.

As an example of the above, assume the core to b initially demagnetized as at $\phi_0$. Application of a positiv set drive field of a predetermined amplitude-limited char acteristic moves the magnetic state of the core alon curve 12 to point 28 representative of the maximum flux density that can be achieved by that particular am plitude-limited characteristic. After cessation of this se drive field the magnetic state of the core falls back alon curve 16 to come to rest at the associated set stable-stat $\phi_1$. Application of a subsequent positive drive field o an amplitude-limited characteristic not exceeding tha of the original set drive field moves the core's magneti state back along curve 16 but not beyond point 28 suc that upon cessation of the subsequent positive drive fiel the core's magnetic state returns along curve 16 to it original set stable-state of $\phi_1$. Application of a subsequen negative drive field of an amplitude-limited characteristi not exceeding that of the original set drive field move the core's magnetic state out along curve 16 but not be yond point 17 such that upon cessation of the subsequen negative drive field the core's magnetic state return along curve 16 to its original set stable-state of $\phi_1$.

Figures 5, 6:
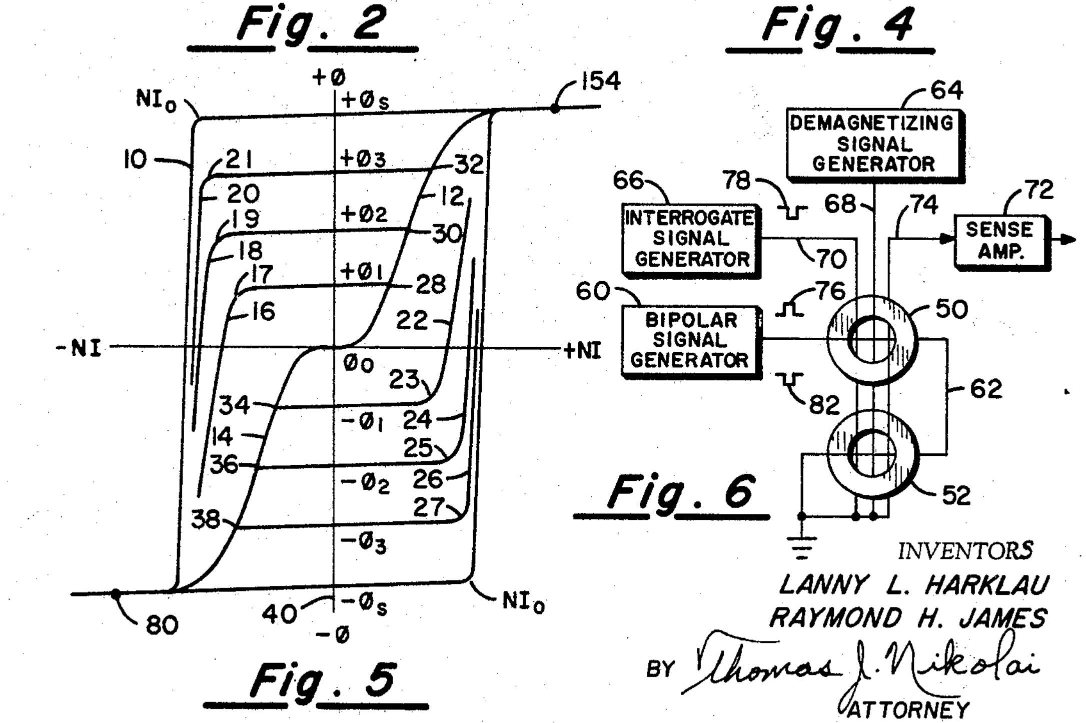
FIG. 5 is an illustration of the residual magnetization of the core of FIG. 1 utilizing amplitude-limited different-amplitude bi-polar drive signals.
FIG. 6 is an illustration of a device for the implementation of the present invention.

Inspection of the curves 16–26 of FIG. 5 illustrate the asymmetric nature of the switching thresholds there of. Remembering that the distance along the axis o abscissas, i.e., in a +NI or −NI direction, represents th magnetizing force of the applied drive field, inspectio of any of curves 16–26 indicates that the distance alon any of such curves from the associated set stable-state along the axis of ordinates, i.e., zero magnetomotive forc line 40, in the +NI or −NI direction to the switchin threshold defined by points 28, 30 and 32 and points 34, 36 and 38 respectively, is less than the distance alon such curves in the opposite directions from the associate set stable-states to the switching thresholds defined b points 17, 19 and 21 and by points 23, 25 and 27, respec tively. As an example: the distance from $\phi_1$ to point 28 is less than the distance from $\phi_1$ to point 17; the distanc from $\phi_2$ to point 30 is less than the distance from $\phi_2$ t point 19; and the distance from $\phi_3$ to point 32 is less tha the distance from $\phi_3$ to point 21. Accordingly, it is aparent that there is provided hereby a method of operat- ıg a magnetizable memory element having different witching thresholds to drive fields of opposite polarity ut of the same amplitude-duration characteristic.

With particular reference to FIG. 6 there is illustrated n apparatus for the implementation of the present inven- ion. In this apparatus there are utilized two substantially imilar toroidal ferrite cores, 50 and 52, each core hav- ıg the magnetic characteristics of FIG. 5. Signal gener- tor 60 is serially coupled to core 50 in a first magnetic ense and to core 52 in a second opposite magnetic sense y way of drive line 62 while demagnetizing signal gen- rator 64 and interrogate signal generator 66 are coupled o cores 50 and 52 in the same first magnetic sense by vay of drive lines 68 and 70, respectively. Sense ampli- ier 72 is coupled to core 50 in a first magnetic sense and o core 52 in a second opposite magnetic sense by way f sense line 74. Operation of this apparatus is as follows:

*1. Demagnetization*

(a) Cores 50 and 52 are placed into an initial sub- tantially demagnetized state by the coupling of a de- nagnetizing signal to line 68 by a constant current source ype generator 64. This demagnetizing signal may consist f an AC signal of a decreasing to zero amplitude. The nitial signal sweep should be sufficient to drive the mag- ıetization of cores 50 and 52 into alternate positive and ıegative saturation such as points $+\phi_s$ and $-\phi_s$ of FIG. 5 with the terminal zero amplitude signal causing the inal magnetic states of cores 50 and 52 to reside at the lemagnetized state of $\phi_0$. Alternatively, cores 50 and 52 could be placed into a substantially demagnetized state y a time- or amplitude-limited drive signal causing their final magnetic states to reside at the set stable-state $\phi_0$.

*2. Write-in*

(a) Write-in is initiated by constant current source ype generator 60 coupling positive, amplitude-limited, set drive signal 76 to cores 50 and 52 by way of line 62; set signal 76 sets the magnetic state of core 50 into its corresponding clockwise amplitude-limited set stable-state along line 40 (see FIG. 5) as for example $+\phi_1$, and sets the magnetic state of core 52 into its corresponding counterclockwise amplitude-limited set stable-state along line 40 as for example $-\phi_1$; i.e., cores 50 and 52 are set into relatively positive-negative polarized intermediate amplitude-limited set stable-states.

*3. Readout*

(a) Readout is initiated by constant current source type generator 66 coupling negative saturating drive signal 78 to both cores 50 and 52 by way of drive line 70; readout drive signal 78 drives the magnetic states of both cores 50 and 52 into a state of substantial negative satura- tion such as point 80 of FIG. 5 and at its cessation allows the magnetic states of cores 50 and 52 to come to rest at the negative saturated stable-state $-\phi_s$.

(b) The variation of the magnetic states of cores 50 and 52, due to the oppositely wound sense line 74 there- about generates an output difference-signal therein due to the net flux change of $$[-\phi_1-(-\phi_s)]-[+\phi_1-(-\phi_s)]=-2\phi_1$$

This generates a positive output signal in sense line 74 indicative of a positive write-in signal 76.

By inspection of FIG. 5 it can be seen that if generator 60 had coupled a negative signal 82 of the same ampli- tude-duration characteristics as signal 76 the magnetic state of core 50 would have been a set stable-state $-\phi_1$ and the magnetic state of core 52 would have been a set stable-state $+\phi_1$, i.e., cores 50 and 52 would have been set into relatively negative-positive polarized intermediate amplitude-limited set stable-states, generating an output difference signal upon readout due to the net flux change of $$[+\phi_1-(-\phi_s)]-[-\phi_1-(-\phi_s)]=+2\phi_1$$

This generates a negative output signal in sense line 74 indicative of a negative write-in signal 82.

Figure 7:
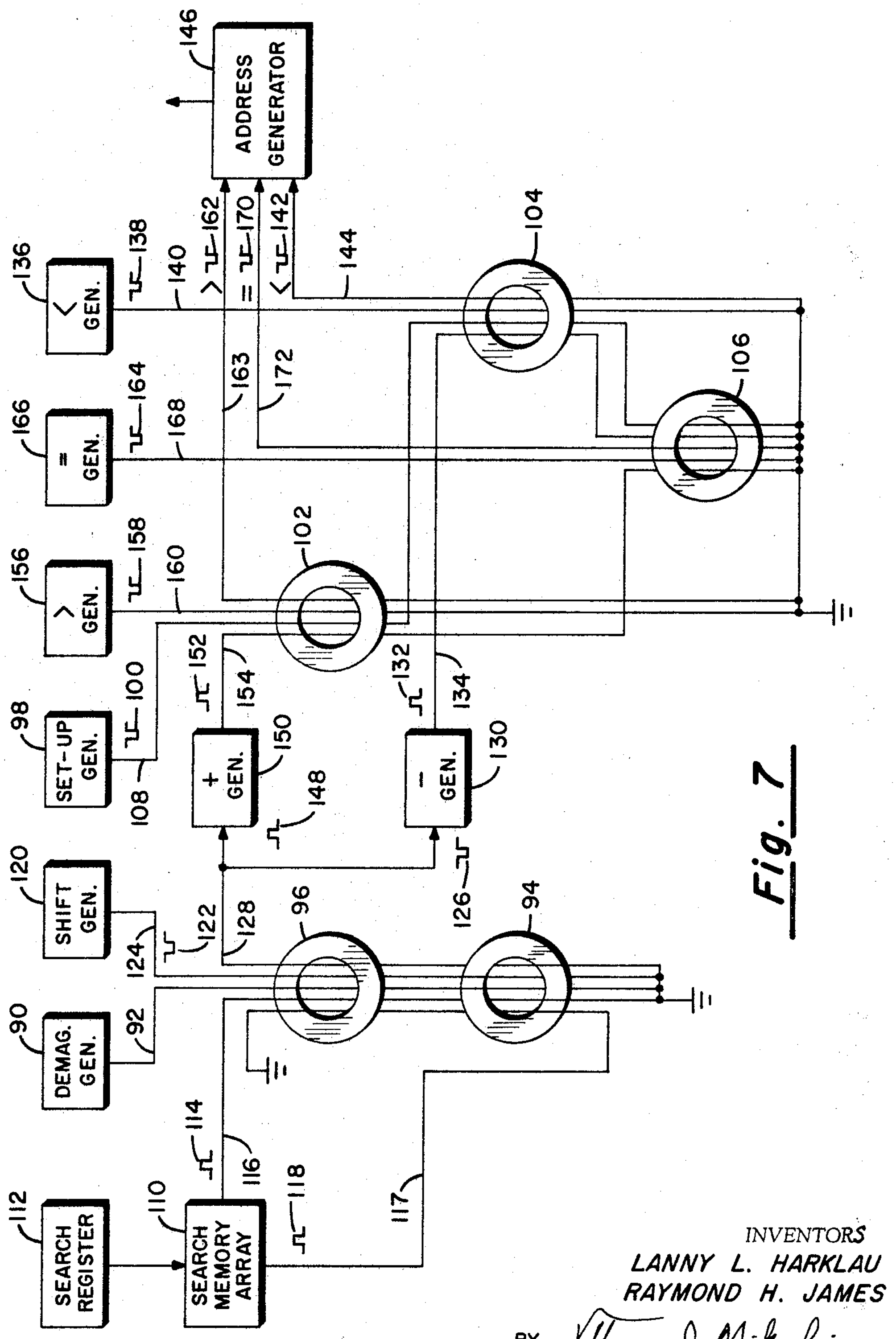
FIG. 7 is an illustration of an apparatus utilizing the device of FIG. 6 for the detection of greater-than, less-than or equality Search memory operation results.

With particular reference to FIG. 7 there is disclosed a preferred embodiment of the present invention as a detector for a Search memory. The Search memory of this application is organized into two half-sections; one section contains the true form of a multi-bit word stored in memory and the other section contains the complement form of the multi-bit word. A search register holds the word searched for with each bit of the multi-bit search word coupled serially to all the corresponding ordered true or complement bits of the plurality of words in memory. If the particular bit of the search word is a "1" it drives all the true forms of the corresponding ordered bits of the memory words while if a "0," it drives all the complement forms of the corresponding ordered bits of the memory words. The memory elements of the Search memory are such that if the bit in the search word matches the bit in the memory word no output signal is induced in the coupled sense line while if the bit in the search word does not match, i.e., mismatches, the bit in the memory word, an output signal is induced in the coupled sense line. Each memory word has two sense lines; one serially coupled to all the true bit forms, and another serially coupled to all the complement bit forms. The search is conducted by initially driving all the serially coupled corresponding highest ordered bits of the memory words according to the search word bit, with the search continued by bit serially driving the serially coupled cor- responding ordered bits of the memory words from the highest to the lowest ordered bits of the search word. After the bit serial search is completed the detectors coupled to the sense lines may then be interrogated to determine the result of the search. In the apparatus of FIG. 7 the inputs may be considered as the outputs of the two sense lines of a memory word of a Search memory array; a mismatch of a true form produces a positive pulse on the true sense line and a mismatch of a comple- ment form produces a positive pulse on the complement sense line, while a match on either form produces no output signal. The following copending patent applica- tions assigned to the same assignee as is the present ap- plication disclose typical true-complement Search mem- ories: V. J. Korkowski, Ser. No. 206,864 filed July 2, 1962 now Patent No. 3,192,512; D. E. Keefer, Ser. No. 19,833 filed Apr. 4,1960 now Patent No. 3,155,945.

For purposes of the present discussion assume that a between-limits search is to be conducted. This requires the performance of two programmed search operations. For the first operation a search word equal to the upper limit is inserted in the search register and a less-than (<) search operation is performed. The < interrogate line is then pulsed by a readout signal providing an output signal from those detectors detecting a < condition. Next, a search word equal to the lower limit is inserted in the search register and a greater-than (>) search operation is performed. The > interrogate line is then pulsed by a readout signal providing an output signal from those detectors detecting a > condition. External logic circuitry accepts both outputs performing an AND decision thereon which if gated by both a < and a > output signal produces a signal indicative of a between- limits find. This signal is then coupled to an address encoder that provides a signal indicative of the address(es) of the between-limits word(s). Additionally as a match produces no output signal an equality (=) search is inherent in both a < and a > search. The = interrogate line is then pulsed by a readout signal providing an output signal from those detectors detecting an = condition.

Initially, the detector of FIG. 7 requires a pre-search set-up operation. This set-up operation involves placing the magnetic states of the constituent cores into a proper magnetic condition. Accordingly, prior to the search operation the following set-up operation is performed:

(a) Demagnetizing signal generator 90 couples a proper signal by way of drive line 92—see the above discussion of FIG. 6—to detector cores 94 and 96 setting them into a demagnetized state.

(b) Set-up signal generator 98 couples a negative saturating drive signal 100 to serially coupled > interrogate core 102, < interrogate core 104 and = interrogate core 106 by way of set drive line 108. Signal 100 sets cores 102, 104 and 106 into counterclockwise, counterclockwise and clockwise flux polarization states, respectively.

Assume that the search word in search register 112 is a multi-bit binary word 1001 in which the left-most bit is the highest ordered bit and the right-most bit is the lowest ordered bit of the general form of an n-bit word $$B_{n-1}B_{n-2} \ldots B_0$$

and that a between limits (< >) search between the limits 1010 and 0101 is to be performed. For the first < programmed operation in the upper limit search word 1010 is placed in search register 112. Next, search register 112, bit-serially, from the highest to the lowest ordered bit, couples appropriate drive signals to the Search memory array 110. Comparison of the first and second highest ordered bits, $B_{n-1}$ and $B_{n-2}$, produces no output signals indicative of a match. Comparison of the third highest ordered bit, $B_{n-3}$, produces an output signal 114 on the true sense line 116 indicative of a mismatch. Signal 114 sets core 96 into the clockwise $+\phi_1$ and core 94 into the counterclockwise $-\phi_1$ set stable-states. Subsequent comparison of the lowest ordered bit $B_0$ produces an output signal 118 on the complement sense line 117 which as discussed with particular reference to FIG. 5 is ineffective as regards the previously set stable-state $+\phi_1$ and $-\phi_1$ of cores 96 and 94, respectively.

For the < readout operation constant current type shift signal generator 120 couples negative saturating shift signal 122 to interrogate line 124. Signal 122 drives the magnetic states of cores 94 and 96 into saturation producing a negative polarity output signal 126 on sense line 128 (see above discussion of FIG. 6). Unidirectional sense amplifier 130, which in the preferred embodiment is an avalanche generator that triggers on negative going signals only, emits a positive saturating drive signal 132 on line 134 which switches, or reverses, the magnetic states of cores 104 and 106 into oppositely polarized flux states from their initial set states. Next, for the interrogate or readout operation constant current type < signal generator 136 couples saturating drive signal 138 to core 104 by way of drive line 140. Signal 138 drives the magnetic state of core 104 back into its initial set state generating a < output signal 142 in < sense line 144 which may be coupled to an address generator 146. The address generator 146 may contain a first < address register for holding the address of the detected < memory word in Search memory array 110 or it may emit an appropriate signal indicative of such address. Preparatory to the next search operation the above discussed set-up operation is performed.

For the second > programmed operation the lower limit search word 0101 is placed in search register 112, Next search register 112, from the highest to the lowest ordered bit, bit-serially couples appropriate drive signals to search memory array 110. Comparison of the highest ordered bit $B_{n-1}$ produces an output signal 118 on the complement sense line 117 indicative of a mismatch. Signal 118 sets core 94 into the clockwise $+\phi_1$ and core 96 into the counterclockwise $-\phi_1$ stable-states. Subsequent comparison of the next lowest ordered bit $B_{n-2}$ produces an output signal 114 on the true sense line 116 which as before is ineffective as regards the previously set stable-states $+\phi_1$ and $-\phi_1$ of cores 94 and 96, respectively. Subsequent comparisons of the third and fourth highest ordered bits, $B_{n-3}$ and $B_0$, produce no output signals, indicative of a match therewith.

For the > readout operation, generator 120 couples signal 122 to interrogate line 124. Signal 122 drives the magnetic states of cores 94 and 96 into saturation producing a positive polarity output signal 148 on sense line 128. Unidirectional sense amplifier 150, which amplifies positive going signals only, emits positive saturating drive signal 152 on line 154 which switches the magnetic states of cores 102 and 106 into oppositely polarized flux states from their initial set states. Next, for the interrogate operation > signal generator 156 couples saturating drive signal 158 to core 102 by way of drive line 160. Signal 158 drives the magnetic state of core 102 back into its initial set state generating a > output signal 162 in > sense line 163 which may be coupled to an address generator 146. Address generator 146 may contain a second > address register for holding the address of the detected > memory word in Search memory array 110 which if gated by the first < address register provides a signal indicative of the address of the memory word that satisfied both the < and > programmed searches.

The apparatus of FIG. 7 is also capable of an equality (=) search. Assuming the search word in search register 112 to be equal to the memory word in Search memory array 110 the programmed < and > searches provide no output signals on sense lines 116 or 117 such that, cores 94 and 96, have remained in their substantially demagnetized set stable-state $\theta_0$. Interrogation of cores 94 and 96 by generator 120 provides no output signals in their associated sense line 128. Consequently, core 106 remains in its initial set state. Now, a negative saturating drive signal 164 coupled to core 106 by = signal generator 166 by way of drive line 168 drives the magnetic state of core 106 into an oppositely polarized flux state generating an = output signal 170 in = sense line 172 which = signal is interpreted by address generator 146 as an = match signal.

Figure 8:
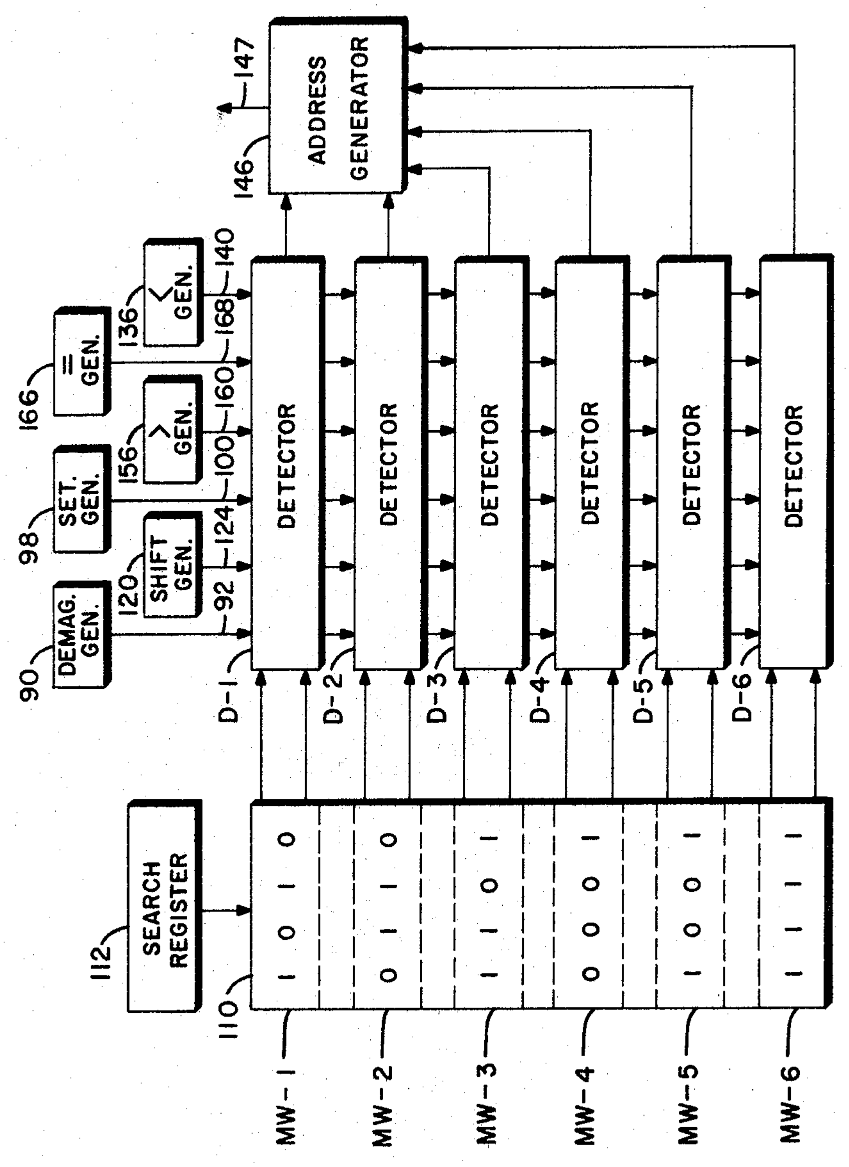
FIG. 8 is an illustration of a multi-word Search memory system utilizing the apparatus of FIG. 7.

With particular reference to FIG. 8 there is disclosed a Search memory system incorporating the apparatus of FIG. 7. In this system Search memory array 110 has an illustrated capacity of six four-bit memory words MW–1, thorugh MW–6; each memory word is coupled to its associated detector D–1 through D–6. The operation of this system is as discussed with particular reference to FIG. 7, above. After an initial set-up operation in which the cores of detector D–1 through D–6 are setup into an initial magnetic state by the coupling of the proper signals thereto by demagnetizing generator 90 and set-up generator 120 the search word or the word that is to be compared to memory words MW–1 through MW–6 of Search memory array 110 is inserted into search register 112. The search is conducted by initially driving all the serially coupled corresponding highest ordered bits of the memory words according to the search word bit, with the search continued by bit serially driving the serially coupled corresponding ordered bits of the memory words from the highest to the lowest ordered bits of the search word. After the bit serial search is completed, the detectors D–1 through D–6 may then be interrogated to determine the result of the previous search. Upon their interrogation the appropriate detectors D–1 through D–6 couple the respectively appropriate output signals representative of a greater-than, less-than or equality match to address generator 146. Address generator 146 in turn then provides an output signal indicative of the address(es) of the particular memory word(s) which will fulfill the particular search function.

As an example and as was previously discussed with respect to FIG. 7, assume that a between limits search is to be conducted on the system of FIG. 8. This requires performance of a two-programmed search operation. For the first operation a search word equal to the upper limit is inserted in search register 112 and a less than search operation is performed. < signal generator 136 then couples a readout signal through serially coupled detectors D–1 through D–6 by way of its associated interrogate line 140 causing those detectors for which a less-than condition was detected to couple an appropriate signal to address generator 146. Next, the previous described initial set-up operation is performed and the search word equal to the lower limit is inserted in search register 112 in preparation for the greater-than search operation. The bit serial comparison of the contents of search register 112 is then conducted with Search memory array 110 whereupon the appropriate signals as before are coupled to the associated detectors. Next, > signal generator 156 couples an appropriate drive signal to serially coupled detectors D–1 through D–6 by way of its drive line 160. Detectors D–1 through D–6 in turn couple an appropriate signal to address generator 146 indicative of a > detected condition. Address generator 146 includes a first < address and a second > address generator whose outputs from corresponding associated detectors D–1 through D–6 are ANDed at a conventional AND gate. If any one of the detectors D–1 through D–6 emits signals indicative of the detection of a > and < match, these signals having been coupled to the associated > address register and < address register, emit ANDing signals to their associated AND gate which is satisfied providing an output indicative of the address of the associated memory word in Search memory array 110 which fulfills the search conditions of a > and < find. Address generator 146 translates this signal into an appropriate signal indicative of the memory address of the corresponding word in Search memory array 110.

As discussed with particular respect to FIG. 7 an = find may be indicated by the coupling of an appropriate signal from = signal generator 166 to the serially associated detectors D–1 through D–6 by way of its drive line 168. Those detectors whose = interrogation core was not affected by the previous > and < searches would emit an appropriate = signal on its = sense line which would be coupled to address generator 146. This = signal would in turn be decoded by address generator 146 providing a signal on its output line 147 that is indicative of the address of the memory word in Search memory array 110 which satisfied the = condition.

Assume the four-bit binary words illustrated in MW–1 through MW–6 addresses of Search memory array 110 and a between limits search between the limits of 1010 and 0010 is to be conducted. As previously discussed, the initial set-up operation is performed first. Demagnetizing generator 90 and set-up generator 98 are pulsed thereby settting their respectively associated cores in to the proper initial magnetic state. Next, the search word 1010, equal to the upper limit, is inserted in search register 112 and the bit serial comparison to the memory words is performed. Inspection of the words in Search memory array 110 indicates that the words MW–2, MW–4, and MW–5 satisfy the < condition and consequently have coupled the appropriate < match signal to their associated detectors D–2, D–4, and D–5. < signal generator 136 is then pulsed with the result that detectors D–2, D–4, and D–5 couple appropriate < signals indicative of a < match to address generator 146, which stores this information in its first < address register. Next, the initial set-up operation is performed. The word 0010, equal to the lower limit, is then inserted in search register 112 and the bit serial comparison of the memory words in Search memory array 110 is completed. Inspection of the words in Search memory array 110 indicates that memory words MW–2, MW–3, MW–5 and MW–6 satisfied the > search. > signal generator 156 is then pulsed causing detectors D–2, D–3, D–5 and D–6 to couple appropriate > signals to address generator 146 which couples such signals to the respectively associated second > address register. As memory words MW–2 and MW–5 are the only words which satisfied both the > and < search condition, the respectively associated stages of the < address register and > address register are the only stages which provide ANDing outputs to their associated AND gates. These AND gates then provide signals which are decoded providing output signals indicative of the addresses of memory words MW–2 and MW–5 in Search memory array 110. Thus, there has been illustrated a Search memory system in which the detectors of the present invention have been utilized to provide a means whereby a > and a < search have been conducted providing appropriate address signals indicative of the words in the Search memory array that satisfied both the > and < search function.

It is understood that suitable modifications may be made in the structure as disclosed provided such modifications come within the spirit and scope of of the appended claims. Having now, therefore, fully illustrated and described our invention, what we claim to be new and desire to protect by Letters Patent is set forth in the appended claims.

What is claimed is:

1. A detector apparatus affected by only the first of two opposite polarity input signals of substantially the same amplitude-duration characteristic, comprising:

first and second magnetic elements each having a substantially rectangular hysteresis characteristic defining first and second oppositely-polarized amplitude-limited stable-states and having a plurality of intermediate amplitude-limited set stable states;

demagnetizing drive means coupled to said elements for setting the magnetization of said elements into a substantially-demagnetized stable-state;

set drive means for initially selectively coupling to said demagnetized elements first or second opposite polarity set drive signals, each signal of substantially the same amplitude-limited characteristic for setting the magnetizations of said elements in a corresponding initial first and second oppositely polarized intermediate amplitude-limited set stable-state;

said set drive means coupled to said first and second elements in an opposing magnetic sense for causing said first or second set drive signals to set the magnetizations of said elements into relatively positive-negative or negative-positive polarized intermediate amplitude-limited set stable-states, respectively;

sense means coupled to said elements in an opposing magnetic sense;

interrogate means coupled to said first and said second elements in the same magnetic sense for setting the magnetizations of said elements into a first or a second saturated stable-state from said intermediate amplitude-limited set stable-states causing said sense means to generate a difference-signal therein;

said difference-signal having first or second opposite polarities, said polarities indicative of said first and second elements having been set into said relatively positive-negative or negative-positive polarized intermediate amplitude-limited set stable-states.

2. A detector apparatus affected by only the first of two oppositely polarized input signals of substantially the same amplitude-duration characteristic, comprising:

first and second magnetic elements each having a substantially rectangular hysteresis characteristic defining first and second oppositely-polarized saturated stable-states and having a plurality of intermediate amplitude-limited set stable-states;

demagnetizing drive means coupled to said elements for setting the magnetization of said elements into a substantially-demagnetized stable-state;

set drive means for initially selectively coupling to said demagnetized elements a first polarity or a second and opposite polarity set drive signal, each of said signals of substantially the same amplitude-limited characteristic, for setting the magnetizations of said elements in a corresponding initial first or second oppositely polarized intermediate amplitude-limited set stable-state;

said set drive means coupled to said first and second elements in an opposing magnetic sense for causing said first or said second set drive signal to set the magnetizations of said first and second elements into relatively positive-negative or negative-positive polarized intermediate amplitude-limited set stable-states, respectively;

sense means coupled to said elements in an opposing magnetic sense;

interrogate means coupled to said first and second elements in the same magnetic sense for setting the magnetizations of both of said elements into the same first or second saturated stable-state from said intermediate amplitude-limited set stable-states causing said sense means to generate a corresponding polarized difference-signal theerin;

said difference-signal having first or second opposite polarities, said polarities indicative of said first and second elements having been set into said relatively positive-negative or negative-positive polarized intermediate amplitude-limited set stable-states.

3. A detector apparatus affected by only the first one of a plurality of opposite polarity input signals of substantially the same amplitude-duration characteristic, comprising:

first and second magnetic elements each having a substantially rectangular hysteresis characteristic defining first and second oppositely-polarized saturated stable-states and having a plurality of intermediate amplitude-limited set stable-states;

demagnetizing drive means coupled to said elements for setting the magnetization of said elements into an initial substantially-demagnetized stable-state;

set drive means for selectively coupling to said demagnetized elements a first or a second and opposite polarity set drive signal, each signal of substantially the same amplitude-limited characteristic, for setting the magnetization of said elements in a corresponding initial first or second intermediate amplitude-limited set stable-state, respectively;

said set drive means serially coupled to said first and second elements in an opposing magnetic sense for causing said first or second set drive signal to set the magnetization of said elements into relatively positive-negative or negative-positive polarized intermediate amplitude-limited set stable-states, respectively;

sense means serially coupled to said elements in an opposing magnetic sense;

interrogate means serially coupled to said first and second elements in the same magnetic sense for setting the magnetization both of said elements into said first or second saturated stable-state from said intermediate amplitude-limited set stable-states causing said sense means to generate a difference-signal therein;

said difference-signal having first or second opposite polarities, said polarities indicative of said first and second elements having been set into said relatively positive-negative or negative-positive polarized intermediate amplitude-limited set stable-state.

4. A magnetic memory apparatus having inherent magnetic lockout, comprising:

a magnetic element having a substantially rectangular hysteresis characteristic defining first and second oppositely-polarized substantially-saturated stable-states and having a plurality of intermediate amplitude-limited stable-states;

demagnetizing drive means coupled to said element for setting the magnetization of said element into a substantially demagnetized stable-state having switching thresholds substantially less than those of said first and second substantially-saturated stable-states;

set drive means initially selectively coupling to said element a first or a second opposite polarity set drive signal, each signal of substantially the same amplitude-limited characteristic, for setting the magnetization of said element in a corresponding initial first or second intermediate amplitude-limited set stable-state said set drive means subsequently coupling said first or second set drive signals to said element and affecting no substantial change in the magnetization of said first or second intermediate amplitude-limited set stable-state producing effective lockout of said subsequent first or second set drive signals for providing an apparatus that is effected by only the first one of said first or second set drive signal.

5. A magnetic memory apparatus having inherent magnetic lockout, comprising:

a magnetic core having a substantially rectangular hysteresis characteristic defining first and second oppositely-polarized saturated stable-states and having a plurality of intermediate amplitude-limited stable states;

demagnetizing drive means coupled to said core for setting the magnetization of said core into a substantially demagnetized stable-state;

set drive means for selectively coupling to said core first or second opposite polarity set drive signals each signal of substantially the same amplitude limited characteristic for setting the magnetization of said core in a corresponding initial first or second intermediate amplitude-limited set stable-state each stable-state having corresponding different switching thresholds to subsequent ones of said first or second set drive signals;

subsequent coupling of said first or second set drive signals to said core affecting no substantial change in the magnetization of said first or second set stable-state producing an effective lockout of said subsequent first and second set drive signals for providing an apparatus that is affected by only the first one of said first and second set drive signals.

6. A magnetic memory apparatus having inherent magnetic lockout, comprising:

a magnetic element having a substantially rectangular hysteresis characteristic defining first and second oppositely-polarized saturated stable-states and having a plurality of intermediate amplitude-limited stable-states;

demagnetizing drive means coupled to said element for setting the magnetization of said element into a substantially demagnetized stable-state;

set drive means for initially selectively coupling to said element first or second opposite polarity set drive signals, each signal of substantially the same amplitude-limited characteristic for setting the magnetization of said element in a corresponding initial first or second intermediate amplitude-limited set stable-state each stable-state having corresponding switching thresholds to subsequent ones of said first or second set drive signals;

subsequent coupling of said first or second set drive signal to said element affecting no substantial change in the magnetization of said first or second intermediate amplitude-limited set stable-state producing an effective lockout of said subsequent first or second set drive signal for providing an apparatus that is affected by only the first one of said first or second set drive signal.

7. A detector for a bit serial search memory having the capability of providing greater-than, less-than and equality find indications, comprising:

a plurality of magnetic elements each having a substantially rectangular hysteresis characteristic defining first and second oppositely-polarized saturated stable-states and having a plurality of intermediate amplitude-limited stable-states;

a first one and a second one of said elements designated first and second detector elements;

a third one of said elements designated the greater-than interrogate element;

a fourth one of said elements designated the equality interrogate element;

a fifth one of said elements designated the less-than interrogate element;

demagnetizing drive means coupled to said first and second elements for setting the magnetization of said elements into an initial substantially-demagnetized stable-state;

set-up drive means coupled to said third, fourth and fifth elements for setting the magnetization of said elements into said first saturated stable-states;

search memory means for initially selectively coupling to said first and second elements a first or a second and opposite polarity set drive signal, each signal of of substantially the same amplitude-limited characteristic for setting the magnetization of said elements in a corresponding initial first or second intermediate amplitude-limited set stable-state;

said search memory means coupled to said first and second elements in an opposing magnetic sense causing each of said set drive signals to set the magnetization of said elements into relatively positive-negative or negative-positive polarized intermediate amplitude-limited set stable-states, respectively;

detector sense means coupled to said first and second elements in an opposing magnetic sense;

interrogate means coupled to said first and second elements in the same magnetic sense for setting the magnetization of said elements into said first or second saturated stable-state from said first or second intermediate amplitude-limited set stable-state causing said sense means to generate a first or a second difference-signal therein;

said first and second difference-signals having first and second opposite polarities, said polarities indicative of said first and second elements having been set into said relatively positive-negative or negative-positive polarized intermediate amplitude-limited set stable-states, respectively;

a first polarity difference-signal responsive first amplifier and a second and opposite polarity difference-signal responsive second amplifier, both parallel coupled to said detector sense means;

said first amplifier output coupled to said third and fourth elements;

said second amplifier output coupled to said fourth and fifth elements;

greater-than sense means coupled to said third element;

equality sense means coupled to said fourth element;

less-than sense means coupled to said fifth element;

said first amplifier when triggered by said first polarity difference-signal coupling a greater-than drive signal to said third and fourth elements driving the magnetization of said third and fourth elements into said second saturated stable-state;

said second amplifier when triggered by said second polarity difference-signal coupling a less-than drive signal to said fourth and fifth elements driving the magnetization of said fourth and fifth elements into said second saturated stable-state;

a greater-than interrogate means coupling an interrogate drive signal to said third element whose magnetization if previously set into said second saturated stable-state by said greater-than drive signal is driven back into said first saturated stable-state generating a greater-than output signal in said greater-than sense means;

a less-than interrogate means coupling an interrogate drive signal to said fifth element whose magnetization if previously set into said second saturated stable-state by said less-than drive signal is driven back into said first saturated stable-state generating a less-than output signal in said less-than sense means;

an equality interrogate means coupling an interrogate drive signal to said fourth element whose magnetization if not previously set into said second saturated stable-state by said greater-than or said less-than drive signal is driven into said second saturated stable-state generating an equality output signal in said equality sense means.

8. A detector for a bit serial search memory having the capability of providing a specified search function find indication, comprising:

a plurality of magnetic elements each having a substantially rectangular hysteresis characteristic defining first and second oppositely-polarized saturated stable-states and having a plurality of intermediate amplitude-limited stable-states;

a first one and a second one of said elements designated first and second detector elements;

a third one of said elements designated the find indicator element;

demagnetizing drive means coupled to said first and second elements for setting the magnetization of said elements into an initial substantially-demagnetized stable-state;

set-up drive means coupled to said third element for setting the magnetization of said element into said first saturated stable-state;

Search memory means for initially selectively coupling to said first and second elements a first or a second and opposite polarity set drive signal, each signal of substantially the same amplitude-limited characteristic for setting the magnetization of said elements in a corresponding initial first or second intermediate amplitude-limited set stable-state;

said Search memory means coupled to said first and second elements in an opposing magnetic sense causing each of said set drive signals to set the magnetization of said elements into relatively positive-negative and negative-positive polarized intermediate amplitude-limited set stable-states, respectively;

detector sense means coupled to said first and second elements in an opposing magnetic sense;

interrogate means coupled to said first and second elements in the same magnetic sense for setting the magnetization of said elements into said first or second staturated stable-state from said intermediate amplitude-limited set stable states causing said sense means to generate a first or a second difference-signal therein;

said first and second difference-signals having first and second opposite polarities, said polarities indicative of said first and second elements having been set into said relatively positive-negative or negative-position polarized intermediate amplitude-limited set stable-states, respectively;

a first polarity difference-signal responsive first amplifier coupled to said detector sense means;

said first amplifier output coupled to said third element;

find indicator sense means coupled to said third element;

said first amplifier when triggered by said first polarity difference-signal coupling a find indicator drive signal to said third element driving the magnetization of said third element into said second saturated stable-state;

a find indicator interrogate means coupling an interrogate drive signal to said third element whose magnetization if previously set into said second saturated stable-state by said find indicator drive signal is driven back into said first saturated stable-state generating a find indicator output signal in said find indicator sense means indicating that the specified search function has been determined.

9. A detector for a bit serial search memory having the capability of providing a between-limits search function find indication, comprising:

a plurality of magnetic elements each having a substantially rectangular hysteresis characteristic defining first and second oppositely-polarized saturated stable-states and having a plurality of intermediate amplitude-limited stable-states;

a first one and a second one of said elements designated first and second detector elements;

a third one of said elements designated the greater-than interrogate element;

a fourth one of said elements designated the less-than interrogate element;

demagnetizing drive means coupled to said first and second elements for setting the magnetization of said elements into an initial substantially-demagnetized stable-state;

set-up drive means coupled to said third and fourth elements for setting the magnetization of said elements into said first saturated stable-states;

Search memory means for initially selectively coupling to said first and second elements a first or a second and opposite polarity set drive signal, each signal of substantially the same amplitude-limited characteristic for setting the magnetization of said elements in a corresponding initial first or second intermediate amplitude-limited set stable-state;

said Search memory means coupled to said first and second elements in an opposing magnetic sense causing each of said set drive signals to set the magnetization of said elements into relatively positive-negative and negative-positive polarized intermediate amplitude-limited set stable-states, respectively;

detector sense means coupled to said first and second elements in an opposing magnetic sense;

interrogate means coupled to said first and second elements in the same magnetic sense for setting the magnetization of said elements into said first or second saturated stable-state from said first or second intermediate amplitude-limited set stable-state causing said sense means to generate a first or a second difference-signal therein;

said first and second difference-signals having first and second opposite polarities, said polarities indicative of said first and second elements having been set into said relatively positive-negative or negative-positive polarized intermediate amplitude-limited set stable-states, respectively;

a first polarity difference-signal responsive first amplifier and a second and opposite polarity difference-signal responsive second amplifier, both parallel coupled to said detector sense means;

said first amplifier output coupled to said third element;

said second amplifier output coupled to said fourth element;

greater-than sense means coupled to said third element;

less-than sense means coupled to said fourth element;

said first amplifier when triggered by said first polarity difference-signal coupling a greater-than drive signal to said third element driving the magnetization of said third element into said second saturated stable-state;

said second amplifier when triggered by said second polarity difference-signal coupling a less-than drive signal to said fourth element driving the magnetization of said fourth element into said second saturated stable-state;

a greater-than interrogate means coupling an interrogate drive signal to said third element whose magnetization if previously set into said second saturated stable-state by said greater-than drive signal is driven back into said first saturated stable-state generating a greater-than output signal in said greater-than sense means;

a less-than interrogate means coupling an interrogat drive signal to said fourth element whose magnetiza tion if previously set into said second saturate stable-state by said less-than drive signal is drive back into said first saturated stable-state generatin a less-than output signal in said less-than sens means;

a between-limits find indicator means coupled to sai greater-than and said less-than sense means;

the coupling of said greater-than and said less-tha output signals to said between-limits find indicatc means providing a between-limits find indication.

10. A true-complement Search memory system for th bit-serial comparison of a search word to a plurality c memory words comprising:

a search register for holding a multi-bit search worc a Search memory for holding a plurality of multi-b memory words storing the true and the complemer form of each bit of each memory word, all the tru forms of all the bits of each separate memory wor coupled to an associated separate true sense line an all the complement forms of all the bits of each ser arate memory word coupled to an associated separat complement sense line;

the search register performing a bit-serial compariso of each bit of the multi-bit search word, from th highest to the lowest ordered bit, by coupling a driv signal from each search register bit position to a the like ordered bits of the memory words, a mi: match of a search register bit "1" generating a tru mismatch signal in its said true sense line and mismatch of a search register bit "0" generating complement mismatch signal in its said complemer sense line;

a plurality of detectors, each separate detector couple to an associated separate memory word by said assc ciated true and complement sense lines;

an initial one of said true or complement mismatc signal when coupled to said associated detector fro said associated memory word setting said associate detector in a first or second information state repr sentative of a true or a complement mismatch, r spectively;

subsequent coupling of said true or complement mi match signal to said associated detector effecting n substantial change in said set information state prc ducing an effective lockout of said subsequent tr or complement mismatch signal providing a detectc that is effected by only the first one of said true c complement mismatch signal;

interrogate means for coupling greater-than, less-tha and equality interrogate drive signals to said dete tors;

the coupling of said greater-than interrogate drive si nal to said detectors providing greater-than outpı signals from those detectors that detected a greate than find condition;

the coupling of said less-than interrogate drive sign to said detectors providing less-than output signa from those detectors that detected a less-than fin condition;

the coupling of said equality interrogate drive signal t said detectors providing equality output signals fro those detectors that detected an equality find cond tion;

an address generator for providing output signals re resentative of the Search memory address of tl memory word associated with a respective detectc output signal;

said greater-than, less-than and equality output signa coupled to said address generator for providin output signals representative of the Search memo address of the memory word associated with a r spective detector output signal.

11. A true-complement Search memory system for th bit-serial comparison of a search word to a plurality of memory words to provide a between-limits find indication, comprising:

a search register for holding a multi-bit search word;

a Search memory for holding a plurality of multi-bit memory words storing the true and the complement form of each bit of each memory word, all the true forms of all the bits of each separate memory word coupled to an associated separate true sense line and all the complement forms of all the bits of each separate memory word coupled to an associated separate complement sense line;

the search register performing a bit-serial comparison of each bit of the multi-bit search word, from the highest to the lowest ordered bit, by coupling a drive signal from each search register bit position to all the like ordered bits of the memory words, a mismatch of a search register bit "1" generating a true mismatch signal in its said true sense line and a mismatch of a search register bit "0" generating a complement mismatch signal in its said complement sense line;

a plurality of detectors, each separate detector coupled to an associated separate memory word by said associated true and complement sense lines;

an initial one of said true or complement mismatch signal when coupled to said associated detector from said associated memory word setting said associated detector in a first or second information state representative of a true or a complement mismatch, respectively;

subsequent coupling of said true or complement mismatch signal to said associated detector effecting no substantial change in said set information state producing an effective lockout of said subsequent true or complement mismatch signal providing a detector that is effected by only the first one of said true or complement mismatch signal;

interrogate means for coupling greater-than and less-than interrogate drive signals to said detectors;

the coupling of said greater-than interrogate drive signal to said detectors providing greater-than output signals from those detectors that detected a greater-than find condition;

the coupling of said less-than interrogate drive signal to said detectors providing less-than output signals from those detectors that detected a less-than find condition;

an address generator for providing output signals representative of the Search memory address of the memory word associated with a respective detector output signal;

said greater-than and less-than output signals coupled to said address generator for providing output signals representative of the Search memory address of the memory words associated with both of said greater-than and said less-than output signals indicative of a between-limits find indication.

12. A true-complement Search memory system for the bit-serial comparison of a search word to a plurality of memory words to provide a specified search function find indication, comprising:

a search register for holding a multi-bit search word;

a Search memory for holding a plurality of multi-bit memory words storing the true and the complement form of each bit of each memory word, all the true forms of all the bits of each separate memory word coupled to an associated separate true sense line and all the complement forms of all the bits of each separate memory word coupled to an associated separate complement sense line;

the search register performing a bit-serial comparison of each bit of the multi-bit search word, from the highest to the lowest ordered bit, by coupling a drive signal from each search register bit position to all the like ordered bits of the memory words, a mismatch of a search register bit "1" generating a true mismatch signal in its said true sense line and a mismatch of a search register bit "0" generating a complement mismatch signal in its said complement sense line;

a plurality of detectors, each separate detector coupled to an associated separate memory word by said associated true and complement sense lines;

an initial one of said true or complement mismatch signal when coupled to said associated detector from said associated memory word setting said associated detector in a first or second information state representative of a true or complement mismatch, respectively;

subsequent coupling of said true or complement mismatch signal to said associated detector effecting no substantial change in said set information state producing an effective lockout of said subsequent true or complement mismatch signal providing a detector that is effected by only the first one of said true or complement mismatch signal;

interrogate means for coupling specified search function interrogate drive signals to said detectors;

the coupling of any one of said specified search function interrogate drive signals to said detectors providing corresponding output signals from those detectors that detected the specified search function find condition;

an address generator for providing output signals representative of the Search memory address of the memory word associated with a respective detector output signal;

said corresponding output signals coupled to said address generator for providing output signals representative of the Search memory address of the memory word associated with the specified search function.

References Cited

UNITED STATES PATENTS

| | | | |
|---|---|---|---|
| 3,037,197 | 5/1962 | Lockhart | 340—174 |
| 2,781,504 | 2/1957 | Canepa | 340—174 |
| 2,768,312 | 10/1956 | Goodale et al. | 307—88 |

JAMES W. MOFFITT, *Primary Examiner.*

U.S. Cl. X.R.

340—146.2, 172.5